United States Patent
Fishler et al.

(10) Patent No.: US 6,393,503 B2
(45) Date of Patent: May 21, 2002

(54) EFFICIENT TRANSFER OF DATA AND EVENTS BETWEEN PROCESSES AND BETWEEN PROCESSES AND DRIVERS IN A PARALLEL, FAULT TOLERANT MESSAGE BASED OPERATING SYSTEM

(75) Inventors: Leonard Richard Fishler, Cupertino; Thomas Marshall Clark, Santa Cruz, both of CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/867,783

(22) Filed: May 29, 2001

Related U.S. Application Data

(63) Continuation of application No. 08/377,303, filed on Jan. 23, 1995, now abandoned.

(51) Int. Cl.⁷ .............................................. G06F 13/00
(52) U.S. Cl. ...................... 710/100; 709/300; 711/147
(58) Field of Search ............................. 710/1, 52, 100, 710/54; 709/201, 216, 100, 215, 300, 301; 711/147–149; 714/11, 15, 18

(56) References Cited

U.S. PATENT DOCUMENTS

| | | | |
|---|---|---|---|
| 4,674,033 A | * | 6/1987 | Miller |
| 4,817,091 A | | 3/1989 | Katzman et al. ............... 371/9 |
| 4,956,771 A | * | 9/1990 | Neustaedter |
| 5,222,217 A | | 6/1993 | Blount et al. ................ 395/325 |
| 5,357,612 A | | 10/1994 | Alaiwan ..................... 395/200 |
| 5,649,092 A | * | 7/1997 | Price et al. |

FOREIGN PATENT DOCUMENTS

| | | | |
|---|---|---|---|
| EP | 0 444 376 A1 | 2/1990 | ............. G06F/9/46 |
| EP | 0 537 401 A1 | 10/1991 | ........... G06F/15/16 |

OTHER PUBLICATIONS

Letwin, G. "Interprocess Communication", Microsoft Press, ED P.Pratt, pp 151–168 (1988).

* cited by examiner

*Primary Examiner*—Gopal C. Ray
(74) *Attorney, Agent, or Firm*—Fenwick & West LLP

(57) ABSTRACT

A parallel, fault-tolerant computer system in which data is transferred between processes in a single CPU by two methods. In a first method, the data is copied each time it is transferred. In a second method, the data is not copied, but is passed through a shared memory, queueing system. The first method is used to ensure fault-tolerance and linear expandability. The second method is used to minimize the time required for inter-process communication. Use of the shared memory queueing system allows for faster communication between processes executing in a same CPU.

13 Claims, 7 Drawing Sheets

EFFICIENT TRANSFER OF DATA AND EVENTS BETWEEN PROCESSES AND BETWEEN PROCESSES AND DRIVERS IN A PARALLEL, FAULT TOLERANT MESSAGE BASED OPERATING SYSTEM

CROSS-REFERENCE TO RELATED APPLICATIONS

This application is a continuation of application Ser. No. 08/377,303, filed on Jan. 23, 1995, now abandoned. This application is also related to U.S. Pat. No. 6,032,267, entitled "Apparatus and Method for Efficient Modularity in a Parallel Fault Tolerant, Message Based Operating System," of Fishler and Clark, issued Feb. 29, 2000, and which is herein incorporated by reference.

APPENDICES

This application is filed with three Appendices, which are a part of the specification and are herein incorporated by reference. The Appendices are:

Appendix A: Descriptions of QIO library routines for a shared memory queueing system.

Appendix B: A description of socket calls supported in a preferred embodiment of the invention.

Appendix C: A list of QIO events occurring in a preferred embodiment of the present invention.

BACKGROUND OF THE INVENTION

1. Field of the Invention

This invention relates to operating system software and, more particularly, to a method and apparatus for increasing the efficiency of data transfer between processes and between processes and drivers in a data processing system.

2. Description of Related Art

Conventional multiprocessor computers and massively parallel processing (MPP) computers include multiple CPUs, executing the same instructions or executing different instructions. In certain situations, data passed between the processors is copied when it is passed from one processor to another. In conventional fault tolerant computers, for example, data is backed up and checkpointed between the CPUs in furtherance of the goals of fault tolerance, linear expandability, and massive parallelism. Thus, in fault tolerant computers, data is duplicated between CPUs and if one CPU fails, processing can be continued on another CPU with minimal (or no) loss of data. Such duplication of data at the processor level is highly desirable when used to ensure the robustness of the system. Duplication of data, however, can also slow system performance.

In some conventional systems, data is transferred between software processes by a messaging system in which data is physically copied from one process and sent to the other process. This other process can either be executing on the same CPU or on a different CPU. The messaging system physically copies each message and sends each message one at a time to the receiving process.

When the copied data is used for purposes of checkpointing between processors, for example, it is desirable that the data be physically copied. At other times, however, the data is merely passed between processes to enable the processes to communicate with each other. In this case, there is no need to physically copy the data when the processes reside in the same CPU. At such times, it may take more time to copy and transmit the data between processes than it takes for the receiving process to actually process the data. When data is transferring between processes executing on the same CPU, it is not efficient to copy data sent between the processes.

Traditionally fault-tolerant computers have not allowed processes or CPUs to share memory under any circumstances. Memory shared between CPUs tends to be a "bottleneck" since one CPU may need to wait for another CPU to finish accessing the memory. In addition, if memory is shared between CPUs, and if one CPU fails, the other CPU cannot be assured of a non-corrupt memory space. Thus, conventionally, messages have been copied between processes in order to force strict data integrity at the process level.

On the other hand, passing data between processes by duplicating the data is time-consuming. To improve execution time, programmers tend to write larger processes that incorporate several functions, instead of breaking these functions up into more, smaller processes. By writing fewer, larger processes, programmers avoid the time-delays caused by copying data between processes. Large processes, however, are more difficult to write and maintain than smaller processes. What is needed is an alternate mechanism for passing data between processes in certain circumstances where duplication of data takes more time than the processing to be performed and where duplication of data is not critical for purposes of ensuring fault tolerance.

SUMMARY OF THE INVENTION

The present invention provides an apparatus and method for improving the efficiency of data transfer between processes and between processes and drivers in a fault tolerant, message based operating system. In the present invention, processes can communicate with each other through two distinct methods. First, processes can communicate with each other using a conventional messaging system, where data is copied each time it is transferred between processes. This first method is used primarily for functions relating to fault tolerance, linear expandability and parallelism where it is desirable, or at least acceptable, to duplicate the data being transferred. Second, processes can communicate with each other by using a shared memory queueing system (sometimes shortened to "shared memory", "queued I/O" or "QIO"). This method is used primarily for functions relating to server processing, LAN protocol processing, and transmitting data between processes running on the same processor.

The shared memory queueing system allows processes executing on the same processor to transmit data without copying the data each time it is transferred. This increase in inter-process speed also makes it possible to divide the processes into small, functional modules. Process modularity can be "vertical," e.g., a single large process can be broken down into several smaller processes with a minimum loss of time lost due to transferring data between the processes. Process modularity can also be "horizontal," e.g., various client processes can access one server process through the shared memory queueing system.

BRIEF DESCRIPTION OF THE DRAWINGS

The invention will now be described with reference to the accompanying drawings, wherein.

DETAILED DESCRIPTION OF THE PREFERRED EMBODIMENTS

The following description is of the best presently contemplated modes of carrying out the invention. This description is made for the purpose of illustrating the general principles of the invention and is not to be taken in a limiting sense. In general, the same reference numbers will be used for the same or similar elements.

Figure 1:
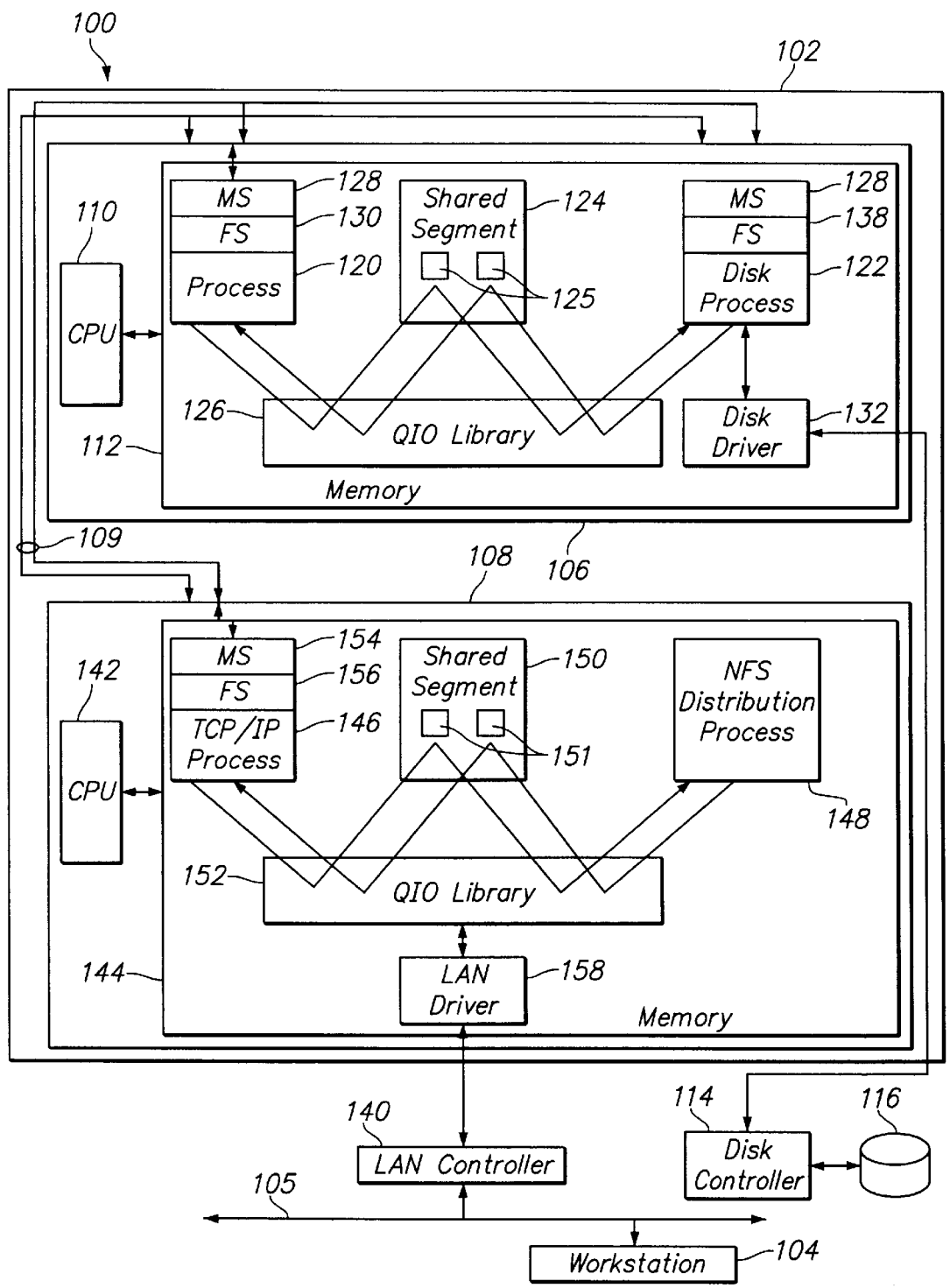
FIG. 1 is a block diagram showing a fault tolerant, parallel data processing system incorporating a shared memory queueing system.

FIG. 1 is a block diagram showing a fault tolerant, parallel data processing system 100 incorporating a shared memory queueing system. FIG. 1 includes a node 102 and a workstation 104 that communicate over a Local Area Network (LAN) 105. Node 102 includes a processor 106 and a processor 108, connected by Inter-Process or Bus (IPB) 109. IPB 109 is a redundant bus, of a type known by persons of ordinary skill in the art. Although not shown in FIG. 1, system 100 is a fault tolerant, parallel computer system, where at least one processor checkpoints data from other processors in the system. Such a fault tolerant system is described generally in, for example, in U.S. Pat. No. , 4,817,091 to Katzman et al., which is herein incorporated by reference. The present invention, however, can be implemented on a variety of hardware platforms without departing from the scope of the invention.

It should be understood that the "processes" shown in FIG. 1 and throughout this document preferably are implemented as software program instructions that are stored in memory and performed by a CPU. Similarly, "drivers" are understood preferably to be implemented as software program instructions that are stored in memory and performed by a CPU. References to a process being "in" a processor or a CPU generally means that the process is stored in memory of the CPU and is executed by the CPU.

Processor 106 includes a CPU 110 and a memory 112 and is connected to a disk controller 114 and a disk drive 116. Memory 112 includes a software process 120, a software disk process 122, and a shared memory segment 124, which includes queues 125, as discussed below. Processes 120 and 122 access shared memory segment 124 through a QIO library routines 126. Messages sent using the shared memory segment and QIO library 126 are sent without duplication of data.

Process 120 communicates over IPB 109 through use of a message system (MS) 128 and a file system (FS) 130. The message system 128 is described in, e.g., "Introduction to Guardian 90 Internal Design," Chapter 6, Tandem Part No. 024507. File system 128 is described in, e.g., "Guardian Programmer's Guide," Tandem Part No. 096042 and "System Procedure Calls Definition Manual," Vol. 1 and 2, Tandem Part Nos. 026148 and 026149, each of which is incorporated by reference.

Disk process 122 sends data to disk 116 through a software disk driver 132 and disk controller 114. Node 102 is connected to LAN 105 through a LAN controller 140. A processor 108 of node 102 includes a CPU 142 and a memory 144. Memory 144 includes a TCP/IP process 146 and an NFS distributor process 148, which communicate through a shared memory segment 150 by use of QIO library routines 152. As described below, shared memory segment 150 includes a plurality of queues 151.

TCP/IP process 146 communicates with IPB 109 through a message system 154 and a file system 156, as described above. TCP/IP process 146 communicates with LAN controller 140 through a software LAN driver 158 by way of QIO library 152. Again, communication using shared memory segment 150 does not involve copying data, while communication using message system 154 and file system 156 does involve copying data. Although not shown in FIG. 1, some implementations of the present invention also may use message system 154 and file system 156 to communicate between processes in a single processor. For example, process 120 may also communicate with disk process 122 using the file and message systems.

Thus, FIG. 1 shows a shared memory queueing system to be used for communication between processes 120, 122 and between processes 146, 148. FIG. 1 also shows communication using a shared memory queuing system between process 146 and LAN driver 158.

Figure 2:
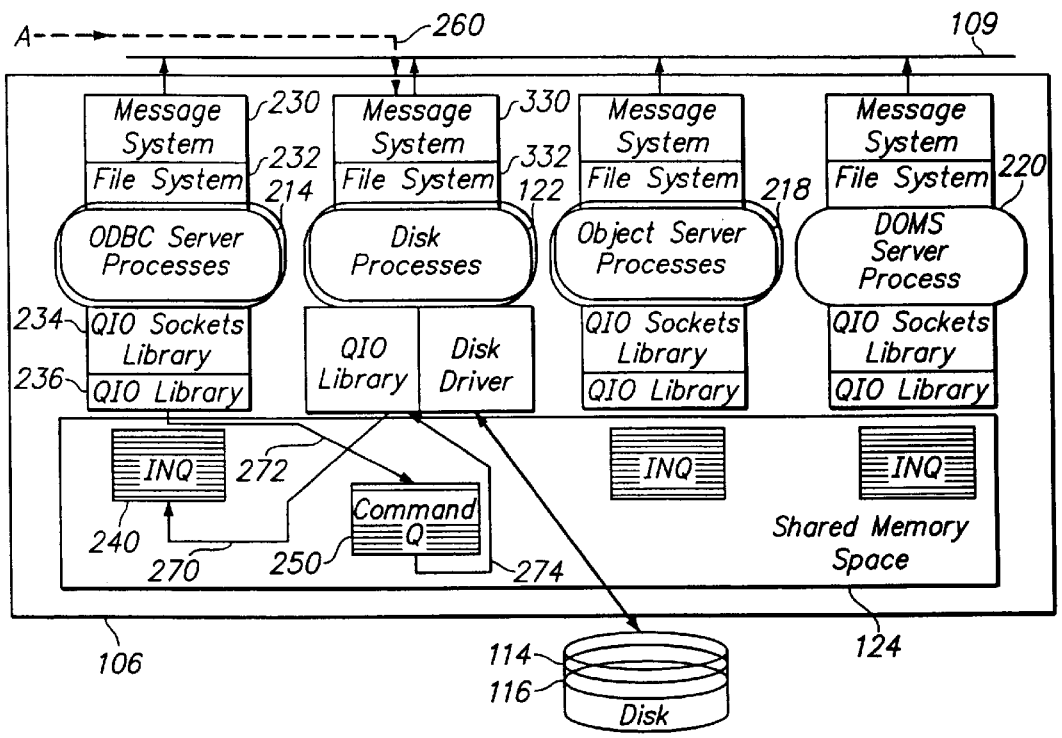
FIG. 2 is a block diagram showing a first processor of FIG. 1.

FIG. 2 is a block diagram showing processor 106 of FIG. 1. FIG. 2 shows four types of processes: a plurality of ODBC Server processes 214, a plurality of Disk processes 122, a plurality of Object Server processes 218, and a DOMS Distributor process 220. "ODBC" stands for "Open Database Connectivity." ODBC is a database client/server methodology that conforms to a standard for remote SQL database access, promoted by Microsoft Corporation. "DOMS" stands for "Distributed Object Management System" and is a CORBA compliant distributed object management server. Each of processes 214, 122, 218, and 220 has an associated message system 230, a file system 232, a QIO sockets library 234, and a QIO library 236. (Libraries 234 and 236 are subsets of library 126 of FIG. 1). Examples of the contents of libraries 234 and 236, are shown in Appendices A and B.

FIG. 2 shows a first method of sending messages between processes, which involves copying the data of messages. Message 260 of FIG. 2 is received on IPB 109 from a process of processor 108 via message system 230 by Disk process 122. This type of message also can be sent between any of the processes in a single processor. For example, it may be desirable that a process be able to reside on any processor. In that case, the process must be able to receive messages both from processes in other processors and processes in the same processor and must send and receive message through its message system 230.

FIG. 2 also shows a second method of sending messages between processes, in which messages are sent by way of the shared memory queuing system. In FIG. 2, process 214 has an associated queue 240 holding messages 270 from other processes (e.g., from process 122). The details of such a queue are discussed below in connection with FIGS. 9–11. Each of processes 214, 218, and 220 has an associated input queue. Process 122 has an associated command queue 250 that holds messages 272 sent by other processes.

Figure 3:
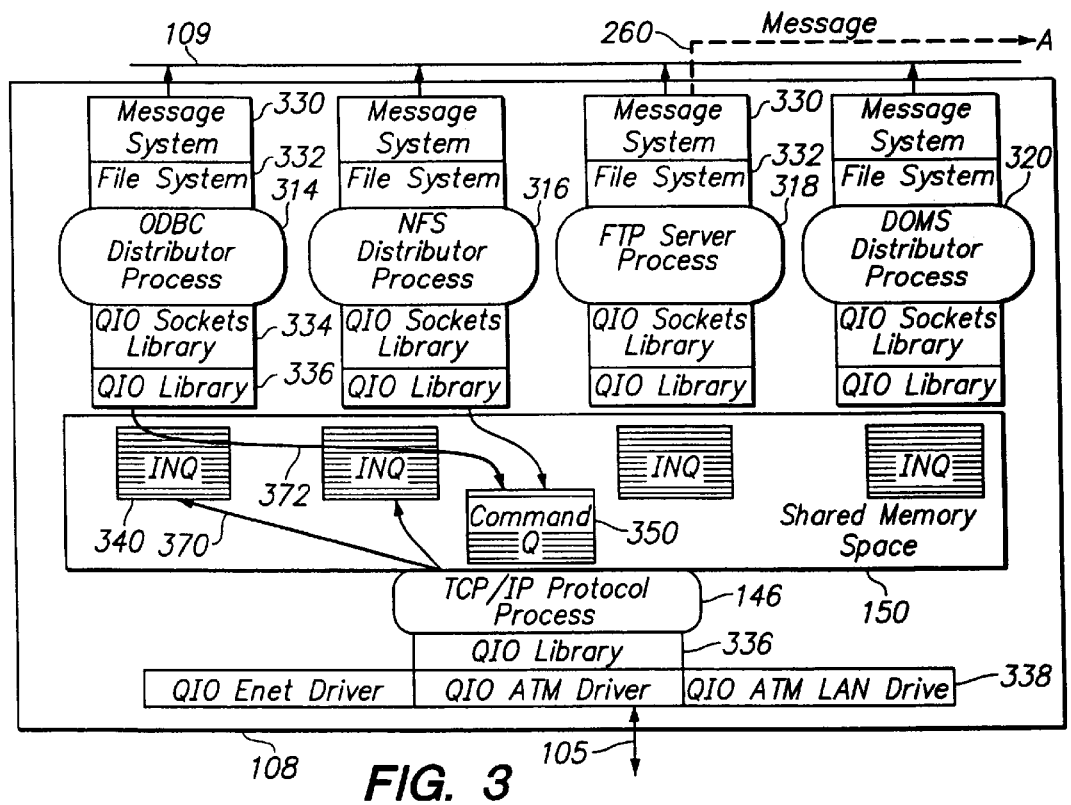
FIG. 3 is a block diagram showing a second processor of FIG. 1.

FIG. 3 is a block diagram showing processor 108 of FIG. 1 including shared memory segment 150. FIG. 3 shows five processes: an ODBC Distributor process 314, an NFS Distributor process 316, an FTP Server process 318, a DOMS Distributor process 320, and a TCP/IP Protocol process 146. "NFS" stands for "Network File System," which is a remote file server standard of Sun Microsystems, Inc. FTP stands for "File Transfer Protocol," which is a communications protocol used for transferring data between computer systems. "TCP/IP" stands for "Transmission Control Protocol/Internet Protocol" and is a communications protocol used to communicate between nodes.

Each of processes 314, 316, 318, and 320 has an associated message system 330, a file system 332, a QIO sockets library 334, and a QIO library 336. (Libraries 334 and 336 are subsets of QIO library 152 of FIG. 1). Examples of the contents of library 336, which is used to access shared memory 150, are shown in Appendix A. Examples of the contents of library 334 is shown in Appendix B.

TCP/IP Protocol process 146 has an associated QIO library 336 for accessing shared memory 150 and three I/O drivers 338. Drivers 338 also communicate with TCP/IP process 146 using the shared memory queueing system in a manner shown in FIGS. 4 and 5.

FIG. 3 shows messages 260 being sent to a process in another processor by way of message system 330 and file system 332. Specifically, FIG. 3 shows a message 260 being sent from process 318 to a disk process 122 shown in FIG. 2 over IPB 109. Thus, messages are sent between processes in processors 106 and 108 using the messaging system. Messages can also be sent between processes within processor 108 using the messaging system. As discussed above, the message system 330 duplicates data when it sends a message.

FIG. 3 also shows a second method of sending messages between processes within a single processor and between processes and drivers within a single processor. In this second method, messages are sent by way of the shared memory queueing system. In FIG. 3, process 314 has an associated queue 340 holding messages 370 from other processes (e.g., from process 146). The details of a queue are discussed below in connection with FIGS. 9–11. Each of processes 314, 316, 318, and 320 has an input queue associated therewith. Process 146 has an associated command queue 350 that holds messages 372 sent by other processes.

FIGS. 2 and 3 demonstrate how use of a shared memory queueing system encourages "horizontal modularity" and "vertical modularity" of processes. Because there is little overhead involved in transmitting data to or from a processor a driver when using the shared memory queueing system, a programmer can easily break a function down into individual processes such as the processes shown in FIGS. 3 and 4. Vertical modularity involves a higher level process, such as process 214, communicating with a lower level process, such as process 122. Horizontal modularity involves a plurality of processes, such as processes 314, 316, 318 and 320, communicating with the same lower level process, such as process 146.

Figure 4:
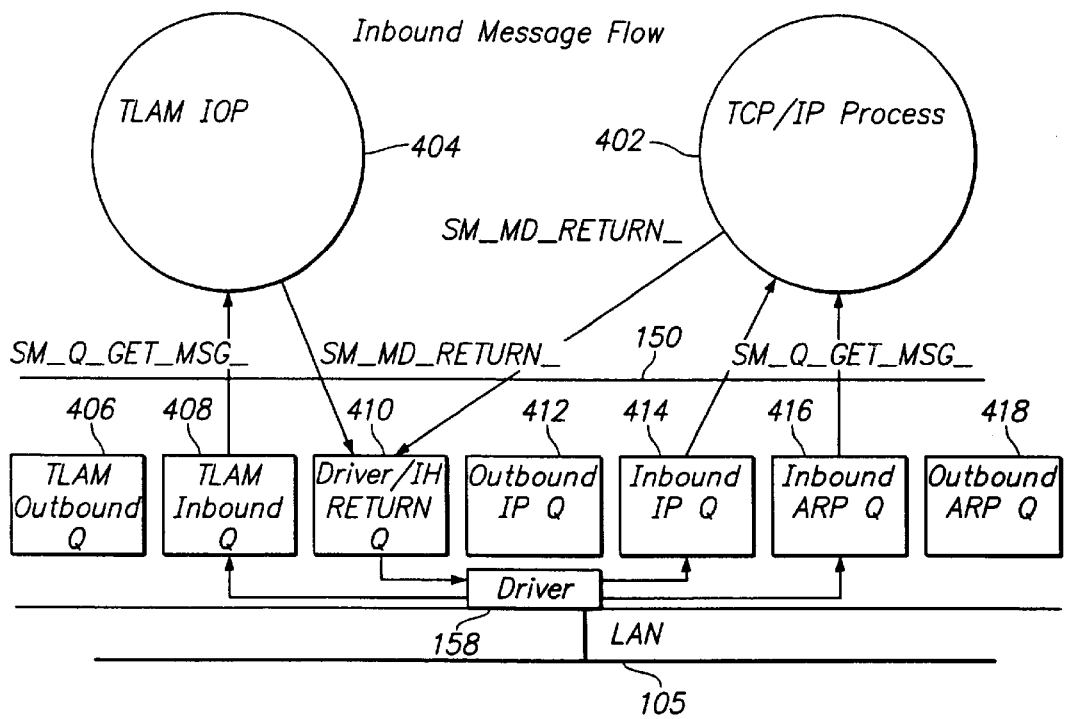
FIG. 4 shows how a TCP/IP process and a TLAM IOP (Tandem LAN Access Method I/O Process) each receive messages from a LAN by way of a shared message queueing system.
Figure 5:
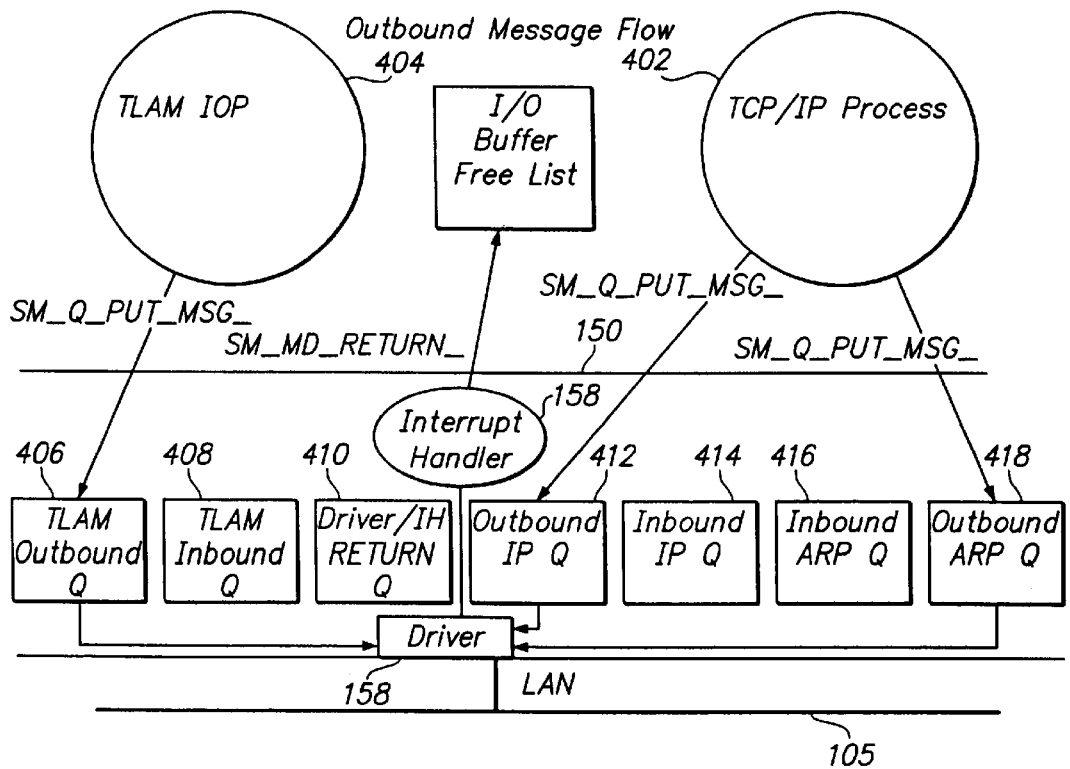
FIG. 5 shows how the TCP/IP process and the TLAM IOP each send messages to the LAN by way of the shared message queueing system.

FIGS. 4 and 5 show examples, respectively, of two processes receiving messages over LAN 105 by way of a driver that accesses the shared memory queueing system. FIG. 5 also shows the processes sending messages over LAN 105 by way of the same driver. In each of the examples of FIGS. 4 and 5, it is assumed that certain set-up functions have been previously performed. For example, each process has "registered" itself with the shared memory queueing system and has received a module ID (see "SM_MODULE_ID_CREATE" of the QIO library routines in Appendix A). The processes use their unique module ID for all interactions with the shared memory queueing system. At registration, each process has an option of defining what percentage of shared memory it is allowed to consume. In a preferred embodiment, a process is a allowed to consume up to 100% of the shared memory as a default. Each process also requests "pool space" from the shared memory queueing system. The pool is used as a "private" space for the process to allocate data structures, such as control buffers.

Each process also registers itself with LAN driver 158 through, e.g., a call to the SM_DR_REGISTER routine of Appendix A. This routine registers a process with a designated LAN and with a designated port. The routine also creates an input queue and an output queue in shared memory for the process and returns a queue ID to the process for each queue created. Thus, in FIG. 4, TCP/IP process 402 registers twice to obtain inbound and outbound ARP queues and inbound and outbound IP queues. An inbound, queue is used to receive messages from LAN 105. As is described above in connection with FIGS. 2 and 3, a process also may have other input and output queues for, e.g., communicating with other processes and/or other drivers. These queues are created through SM_Q CREATE of Appendix A. The outbound queue is used to hold message descriptors for data to be sent to LAN 105. The driver/interrupt handler 158 maintains a table stored in memory that is used to route inbound messages to the correct inbound queue. A client process can then retrieve messages from its inbound queue.

FIG. 4 shows how a TCP/IP process 402 and a TLAM IOP (Tandem LAN Access Method I/O Process) 404 each receive messages from LAN 105 by way of the shared message queueing system. TCP/IP process 402 uses known TCP/IP protocol and receives both IP and ARP messages. Thus, TCP/IP process 402 has two inbound queues and two outbound queues. TLAM IOP 404 uses an industry standard interface for accessing a LAN. TLAM IOP 404 is based on the IEEE 802.2 Logical link control standard and supports Type 1 connection-less service as well as the MULTILAN NETBIOS protocol. "MULTILAN" is a trademark of Tandem Computers, Inc. Thus, TLAM IOP 404 can connect to various types of LANs.

Figure 9:
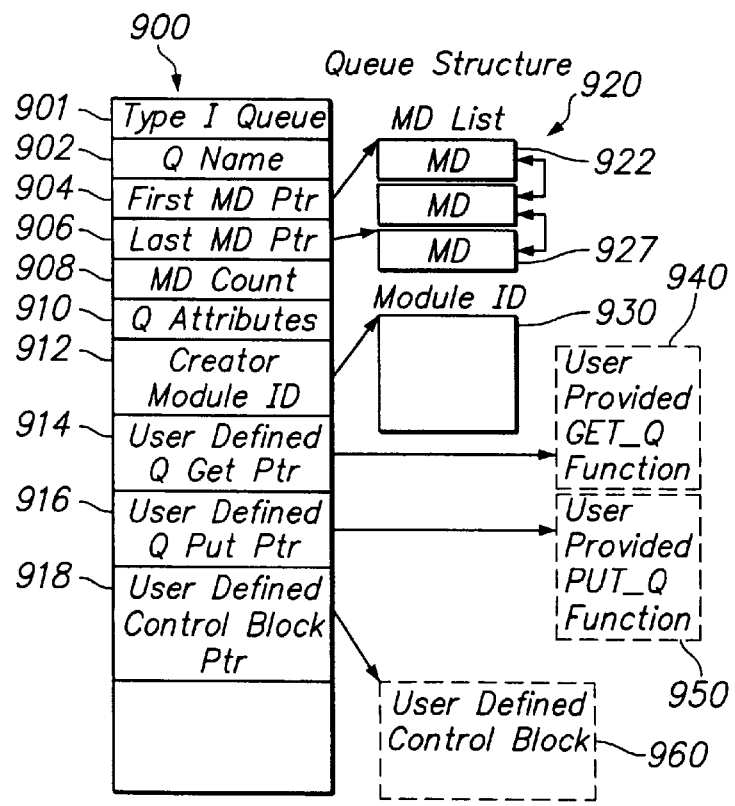
FIG. 9 shows a format of a queue in the shared memory queueing system.

When driver 158 receives a message from LAN 105, it places the message on an inbound queue for a correct process and awakens the process that is identified in that queue's creator module ID field (see FIG. 9). Thus, for example, in FIG. 4, an incoming message may be placed in either a TLAM inbound queue 408, an inbound IP queue 414, or an inbound ARP queue 416. The driver/interrupt handler 158 looks at the table stored in memory to determine in which queue to place an incoming message, depending on the recipient indicated by the message, and to determine which process to awaken.

Figure 12A:
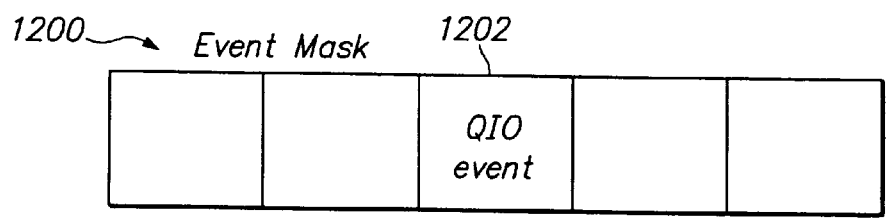
FIGS. 12(a) and 12(b) show masks used by the shared memory queueing system during a QIO event.
Figure 12B:
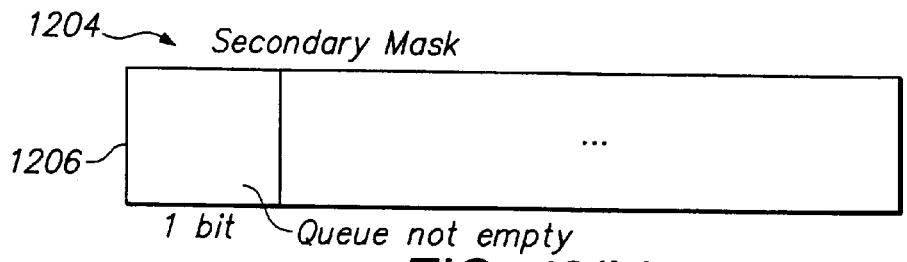

Processes are awakened with a "QIO event". A QIO event uses the computer's operating system to set a QIO bit in an event mask, such as that shown in FIG. 12(a) and a bit in a QIO secondary mask (see FIG. 12(b) to indicate that the process's queue is not empty. When an event occurs, the operating system wakes up the receiving process, i.e., the process goes from a wait state to a ready state. If the event mask 1200 has a QIO bit 1202 set, the process checks the QIO secondary mask 1204. When the "QUEUE_NOT_EMPTY" bit 1206 is set, the process consumes data from an associated queue. Examples of QIO events are shown in Appendix C.

A process consumes messages from an inbound queue by calling, e.g., SM_Q_GET_MSG of Appendix A. This routine gets a message from the top of the queue. Driver 158 sets up the inbound queue so that the return queue pointer 1022 (see FIG. 10) points to the driver's return queue 410. Thus, the process simply calls, e.g., SM_MD_RETURN of Appendix A to return the buffer to driver 158 for reuse.

FIG. 5 shows how TCP/IP process 402 and TLAM IOP 404 send messages to LAN 105 by way of the shared message queueing system. To send a message, a process calls, e.g., SM_Q_PUT_MSG of Appendix A, which invokes the PUT routine in the outbound queue specified. This places the message on an outbound queue defined by the driver. The process may, but is not required to, indicate a return queue so that driver 158 will return the message after it is sent. Thus, when TLAM IOP 404 calls SM_Q_PUT_MSG, the message to be sent invokes the "PUT" routine of TLAM outbound queue 406. Similarly, when TCP/IP 402 calls SM_Q_PUT_MSG for an ARP message, the message to be sent invokes the "PUT" routine of outbound ARP queue 418. When TCP/IP 402 calls SM_Q_PUT_MSG for an IP message, the message to be sent invokes the "PUT" routine of outbound IP queue 412.

In a preferred embodiment, driver 158 does not place the message on the queue but first checks to see if the message can be sent to LAN 105. If so, driver 158 sends the message. Otherwise, driver 158 places the message on a queue internal to the driver. When an interrupt occurs, driver 158 checks whether there are outgoing messages queued. If so, the driver removes the message from its internal queue and sends it. The message buffer is returned to the buffer free list if no return queue was specified in the queue structure.

When a process wants to disconnect from LAN 105 it calls, e.g., SM_DR_DEREGISTER of Appendix A. This routine deletes the inbound and outbound queues for the process and removes the process from the driver's internal routing table.

Figure 7:
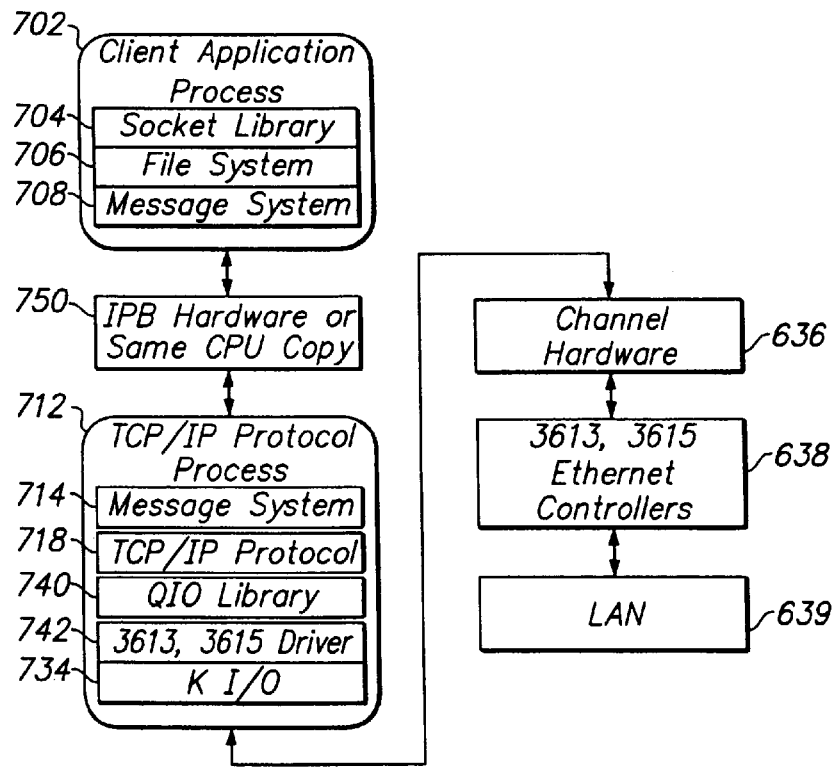
FIG. 7 shows a data path of data output from an application process to a LAN in a first embodiment of the present invention.
Figure 8:
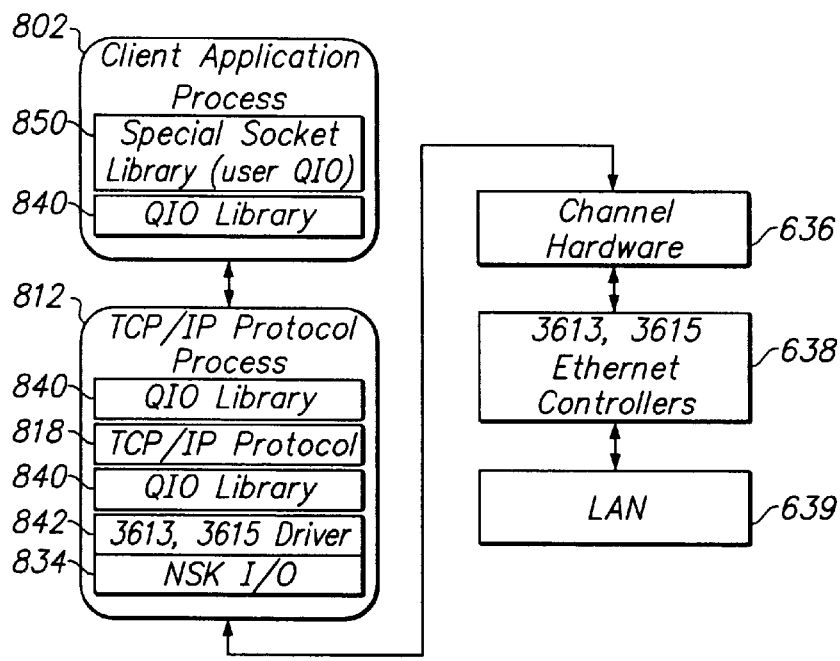
FIG. 8 shows a data path of data output from an application process to a LAN in a second embodiment of the present invention.

The shared memory queueing system of the present invention allows improvements in the content and organization of processes in the system and improves the efficiency of data paths traveled by data in the system. For example, the present invention allows an efficient implementation of the OSI seven-layer communication protocol, which is used to send and receive data over a LAN using TCP/IP. The following discussion of FIGS. 6–8 shows how use of a shared memory queueing system increases the speed and efficiency of implementation of the OSI model in a fault tolerant computer system.

Figure 6:
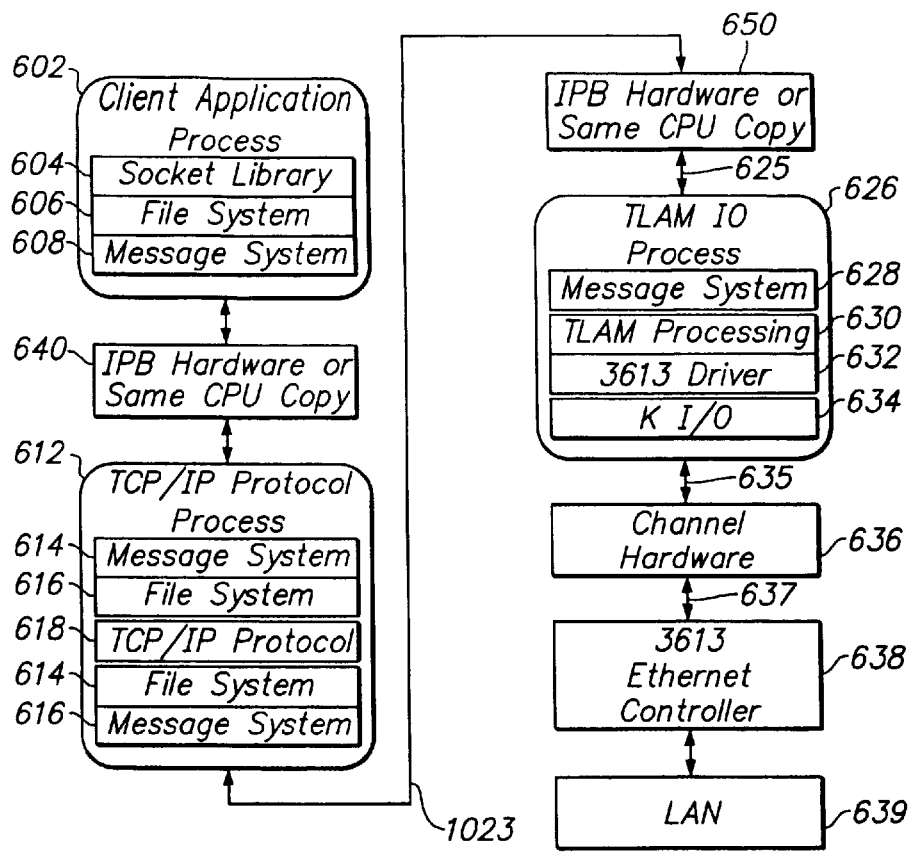
FIG. 6 shows a data path of data output from an application process to a LAN in a system that does not include a shared memory queueing system.

FIG. 6 shows a data path for transmitting data between an application process 602 and an Ethernet LAN 639 in a system that does not include shared memory queueing. Client application process 602 includes a socket library 604, a file system 606, and a message system 608. Message system 608 sends data to a TCP/IP protocol process 612, which can be either in the same processor or in another processor. Transmission to the same processor is effected by copying the data and transmitting it to message system 614 of TCP/IP process 612. Transmission to another processor is effected by copying the data and transferring it over IPB 109 (see FIG. 1), where it is copied again before being handed to TCP/IP process 612.

TCP/IP process 612 includes a message system 614, a file system 616, and a TCP/IP protocol procedure 618. Message system 614 and file system 616 are shown twice to indicate that they are used both for input to process 612 and for output from process 626. Message system 626 sends data to a TLAM I/O process 616, which can be either in the same processor or in another processor. Transmission to the same processor is effected by copying the data and transmitting it to messaging system 628 of TLAM I/O process 626. Transmission to another processor is effected by copying the data and transferring it over IPB 109, where it is copied again before being handed to TLAM I/O process 626.

TLAM I/O process 626 includes message system 628, a TLAM procedure 630, a 3613 driver 632, and a kernel I/O driver 634. Driver 634 passes data to channel hardware 636, which passes the data to an Ethernet controller 638. Ethernet controller 638 passes the data to the LAN 639. A disadvantage of the data path of FIG. 6 is that the data must be copied at least once each time it is passed through the message system, i.e., at 640, 650.

FIG. 7 shows a data path for transmitting data between an application process 702 and LAN 639 in a first embodiment of the present invention, including both a messaging system and a shared memory queueing system. Client application process 702 includes a socket library 704, a file system 706, and a message system 708. Message system 708 sends or receives data to or from a TCP/IP protocol process 712, which can be either in the same processor or in another processor. Transmission to the same processor is effected by copying the data and transmitting it to message system 714 of TCP/IP process 714. Transmission to another processor is effected by copying the data and transferring it over IPB 109, where it is copied again before being handed to the process.

TCP/IP process 712 includes message system 714, and a TCP/IP protocol procedure 718. Message system 714 is used to send and receive data from process 702. In FIG. 7, data is sent and received from TCP/IP process 712 to driver 742 in the manner shown in FIGS. 5 and 6. Thus, in the present invention, data passes through the message system fewer times and data is copied fewer times (i.e., at point 750) during transmission, resulting in a time savings and more efficient processing when sending and receiving data from a LAN.

FIG. 8 shows a data path data for transmitting data between an application process 802 and LAN 639 in a second embodiment of the present invention. Client application process 802 includes a special socket library 850 and a QIO library 840. Process 802 queues data through the socket library and the QIO library. To receive data through the shared memory queueing system, TCP/IP process 812 must be in the same processor as process 802. Transmission to and from another processor is effected by copying the data and transferring it over IPB 109 via the message system of FIG. 1 (not shown in FIG. 8). Transmission between processes in the same processor generally is effected through the shared memory queueing system.

TCP/IP process 812 retrieves messages from the queueing system through routines in its QIO library 840. Thus, in the second embodiment, data passes through the message system only when it is desirable to duplicate the data (such as for checkpointing and backup purposes) and/or when the data is sent over IPB 109. This reduced copying of data results in a great time savings and efficiency in implementing inter-process communication between processes in a single processor that send and receive messages (e.g., as in a network multimedia application that sends and receives large amounts of data over a LAN.)

FIG. 9 shows a format 900 of a queue in the shared memory segments 124, 150. Queue 240 of FIG. 2, for example, has the format of FIG. 9. A queue includes a descriptor type 901, a human readable queue name 902, a first message descriptor (MD) pointer 904, a last message descriptor pointer 906, a message descriptor count 908, queue attributes 910, a creator module ID 912, a pointer 914 to a user-defined "GET-Q" function 940, a pointer 916 to a user-defined "PUT-Q" function 950, and a pointer 918 to a user-defined control block 960.

Descriptor type 901 indicates that this data structure is a queue. Queue name 902 is a name of the queue, such as "ODBC DIST IN Q". First message descriptor (MD) pointer 904 points to a first message descriptor 922 of a first message in a doubly linked list of messages 920. Last message descriptor pointer 906 points to a first message descriptor 924 of a last message in doubly linked list 920. The format of a message is described below in connection with FIGS. 10 and 11.

Message descriptor count 908 holds the number of messages in the doubly linked list 920. Queue attributes 910 includes attributes of the queue, e.g., whether a process should be awakened when data is PUT to its inbound queue. Creator module ID 912 is an ID of a module (or process) that created the queue. The shared memory system generally awakens this process whenever a queue has become non-empty (see, e.g., FIG. 4 and 5). Pointer 914 points to a user-defined "GET-Q" function. The GET-Q function is a function that is performed whenever a GET function is performed to get information from the queue. It allows the user-defined function to be performed in addition to or instead of a standard "GET" function in the QIO library. For example, if the queue is an inbound queue for an I/O driver, a user-defined GET function might initiate an I/O operation by the driver. The driver may also keep track of a number of outstanding I/Os and may adjust this number whenever a GET (or PUT) is performed. As another example, a GET may cause a housekeeping routine to be performed by the process that created the queue.

Pointer 916 points to a user-defined "PUT-Q" function, which is performed whenever a PUT function is performed to put information into the queue. It allows the user-defined function to be performed in addition to or instead of a standard "PUT" function. For example, in a queue associated with a LAN driver, the PUT-Q function may invoke a transport layer routine to output information to LAN 105. Pointer 918 points to a user-defined control block 960. Often this control block is a control block needed by one or both of the PUT-Q and GET-Q functions. For example, the control block might be a control block for a driver that outputs information when the information sent to the queueing system.

Figure 10:
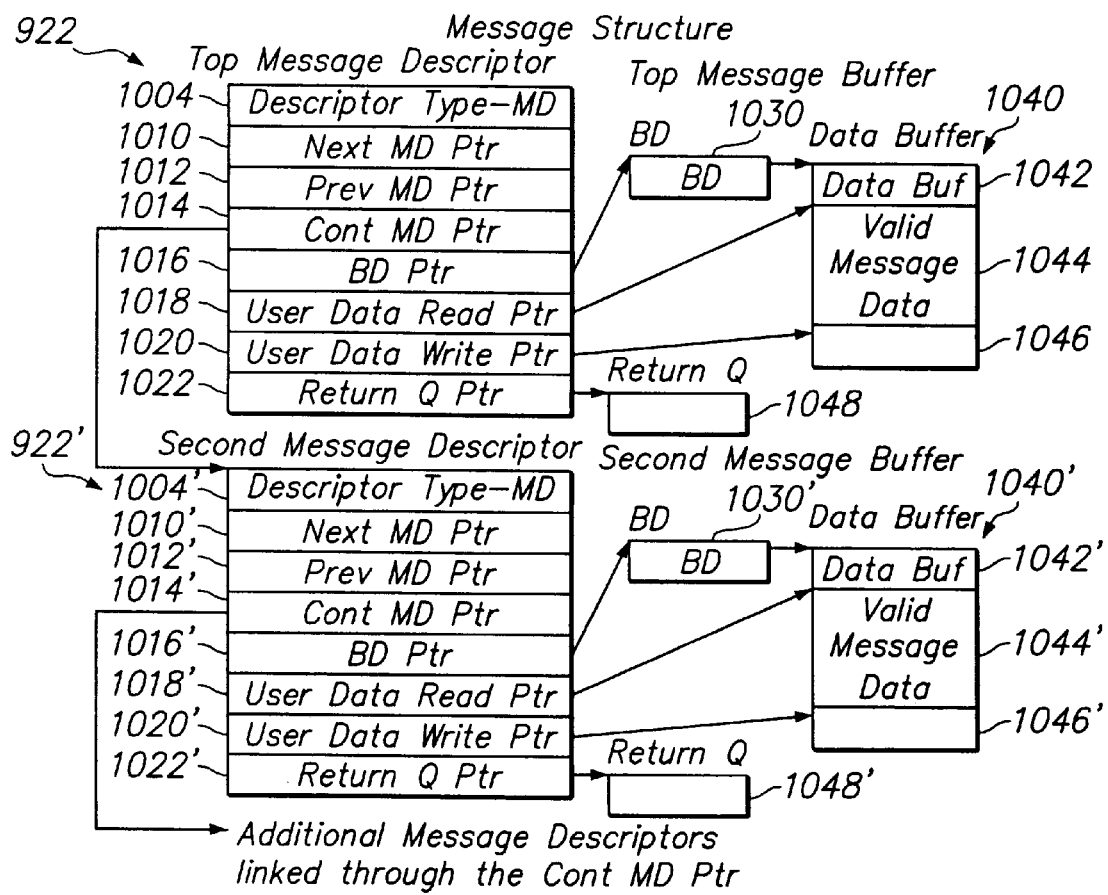
FIG. 10 shows a format of a message stored in the queue of FIG. 9.

FIG. 10 shows a format of a message stored in doubly linked list 920 of FIG. 9. A message is made up of linked message descriptors. Messages (made up of one or more linked message descriptors) are then linked together as shown in list 920 of FIG. 9. FIG. 10 shows message descriptors 922 and 922', which are joined in a linked list by pointers 1014 and 1014' to form a message. A message descriptor includes a descriptor type 1004, a next message descriptor pointer 1010, a previous message descriptor pointer 1012, a continued message descriptor pointer 1014, a buffer descriptor (BD) pointer 1016, a user data read pointer 1018, a user data write pointer 1020, and a return queue pointer 1022.

In FIG. 10, message descriptors 922 and 922' form a single message. Descriptor type 1004 indicates that the descriptor is a message descriptor. Next message descriptor pointer 1010 points to the first message descriptor of a next message stored in doubly linked list 920. Previous message descriptor pointer 1012 points to the first message descriptor of a previous message stored in doubly linked list 920. Continued message descriptor pointer 1014 points to a next message descriptor in the current message. Scattered data needs multiple message descriptors and a single message may be formed of multiple message descriptors pointing to data in different buffer locations. Buffer descriptor (BD) pointer 1016 points to a buffer descriptor 1030, which is described in more detail below in connection with FIG. 11. Buffer descriptor 1030 points to a data buffer 1040.

User data read pointer 1018 is a pointer into buffer 1040 indicating a location 1044 in data buffer 1040 where reading should commence (or has stopped). User data write pointer 1020 is a pointer into buffer 1040 indicating a location 1046 in data buffer 1040 where writing should commence (or has stopped). Return queue pointer 1022 points to a return queue. When a message is returned, via the shared memory queueing system (i.e., when processing of the message is complete), the returned message is placed on the return queue if a return queue is specified. For example, the current process may need to count messages sent. Instead of putting the message into a "free memory pool" when it is removed from the queue, the message is placed on the return queue for further processing by the current process. Other message descriptors in a message may have different, secondary return queue pointers 1022' or no return queue pointers. These secondary return queue pointers are processed by individual processes associated with the primary return queue.

Figure 11:
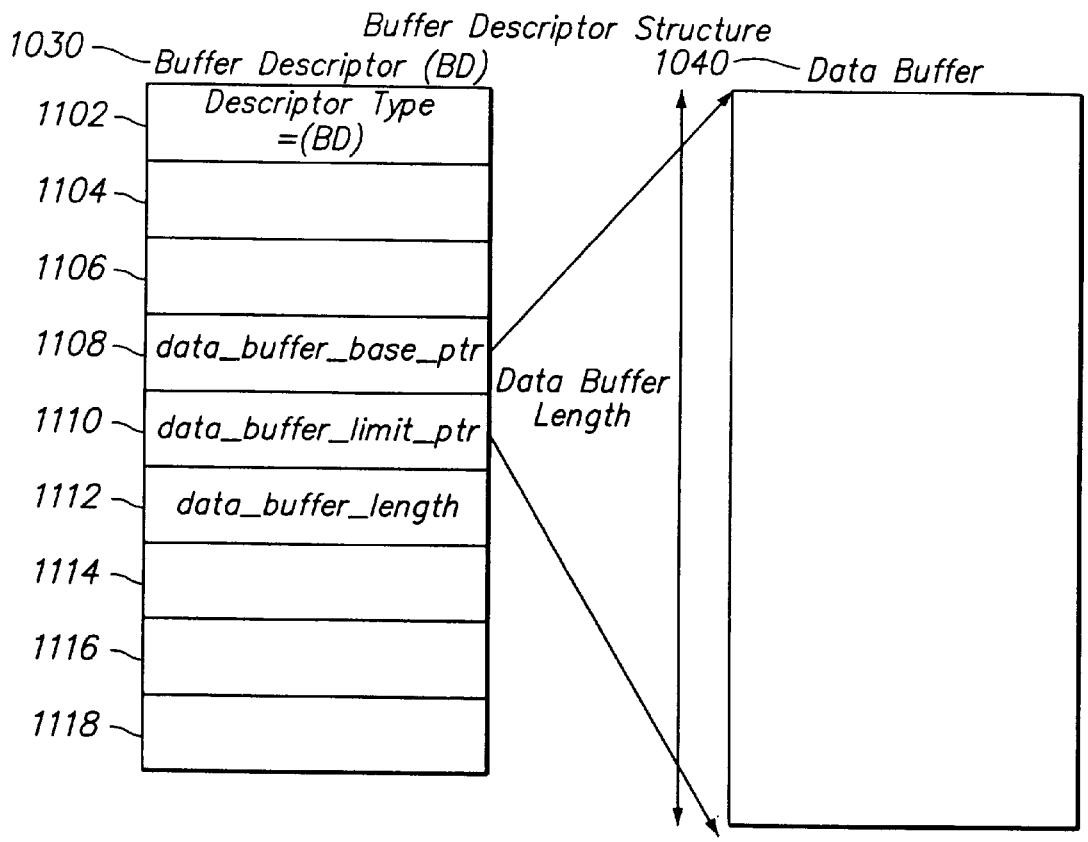
FIG. 11 shows a format of a buffer descriptor, which is a part of the message of FIG. 10.

FIG. 11 shows a format of a buffer descriptor 1030, which is a part of the message of FIG. 10. Buffer descriptor 1030 includes a descriptor type 1102, a data buffer base pointer 1108, a data buffer limit pointer 1110, and a data buffer length 1112. Descriptor type 1102 indicates that the descriptor is a buffer descriptor. Data buffer base pointer 1108 points to a base of data buffer 1140 in memory. Data buffer limit pointer 1110 points to an end of data buffer 1140. Data buffer length 1108 is the length of data buffer 1040.

In summary, use of a shared memory queueing system increases the speed of operation of communication between processes in a single processor and, thus, increases the overall speed of the system. In addition, use of a shared memory queueing system frees programmers to implement both vertical modularity and horizontal modularity when defining processes. This increased vertical and horizontal modularity improves the ease of maintenance of processes while still allowing efficient transfer of data between processes and between processes and drivers. Moreover, the described embodiment includes a message system in which data is copied during transmission. Such copying is desirable, e.g., to ensure fault tolerance. Execution speed lost by copying messages between processors is acceptable because of the added reliability gained by checkpointing these inter-processor transmissions.

In describing the preferred embodiments, a number of specific technologies used to implement the embodiments of various aspects of the invention were identified and related to more general terms in which the invention was described. However, it should be understood that such specificity is not intended to limit the scope of the claimed invention.

APPENDIX

A

QIO Library External Specification

5.1 SM_DR_DEREGISTER_

C Syntax

```
short SM_DR_DEREGISTER_ (
    const q_id_type port_in_qid
    const q_id_type port_out_qid
)
```

TAL Syntax

```
INT PROC SM_DR_DEREGISTER_ (port_in_qid,port_out_qid)
        CALLABLE, LANGUAGE C;
    INT(32) port_in_qid;
    INT(32) port_out_qid;
EXTERNAL;
```

Return Values

Returns zsm_err_ok if successful, error if not.

Error Values zsm_err_semaphore_timeout - failed to get driver semaphore.

Any error returned from SM_Q_GET_ID_.

Description

This function removes a port registration with the driver. After deregistration, clients can no longer send outbound messages. Any inbound messages received for the deregistered port are routed to TLAM.

QIO Library External Specification

PSPEC

Verify that the port out and in queues still exist by calling SM_Q_GET_ID_. Return any errors to the caller.

Obtain driver semaphore. Return error if failed to get driver semaphore.

Remove entry from SDN-PCB table.

Delete the port out and in queues by calling SM_Q_DELETE_.

Return status.

QIO Library External Specification

5.2 SM_DR_GET_INFO_

C Syntax short SM_DR_GET_INFO_ (
    const char *port_name_Ptr,
    dr_info_type *port_info_Ptr)

TAL Syntax

INT PROC SM_DR_GET_INFO_ (port_name_Ptr, port_info_Ptr)
    CALLABLE, LANGUAGE C;
    STRING .EXT port_name_Ptr;
    STRING .EXT port_info_Ptr;
EXTERNAL;

Return Values

Returns zsm_err_ok if successful, error if not.

Error Values zsm_err_dr_inv_dev_name - the out queue for the specified device name was not found.

zsm_err_dr_dev_down - line is in the stopped state.

zsm_err_dr_inv_port_name - port has not been added.

zsm_err_dr_port_down - port is in the stopped state.

zsm_err_semaphore_timeout - failed to get driver semaphore.

Description

This function returns a pointer to the dr_info structure. The caller can use this information to find details related to the driver, line, and port. There are cases in which some fields in the dr_info structure do not exist. For instance, if the port has not been added, only the driver and line related fields can be returned. Another case would be if the line and port existed, but the

QIO Library External Specification line was not in the started state. In this scenario the controller is unloaded and the MAC address is unknown. The "PSPEC" paragraph indicates which fields in the dr_info are valid for each return code.

See the file smlibh for the definition of dr_info.

PSPEC

Verify that the line exists. Return zsm_dr_inv_dev_name if line does not exist.

Obtain driver semaphore. Return zsm_err_semaphore_timeout if failed to get driver semaphore.

Initialize memory for dr_info structure with zeroes.

Set the following fields in the dr_info structure: dr_state, ctlr_type, lip_aggr_size.

Find the DR_PCB for the specified port. Return zsm_err_dr_inv_port_name if the port does not exist.

Set the following port related fields in the dr_info structure: port_state, port_type, max_sdu_size, min_sdu_size.

Return zsm_err_dr_dev_down if the port is NOT in the started state.

Copy the MAC address into the dr_info struct.

Return zsm_err_dr_port_down if the port is NOT in the started state.

QIO Library External Specification

5.3 SM_DR_REGISTER_

C Syntax

```
short SM_DR_REGISTER_ (
    const char* port_name_Ptr,
    q_id_type* port_in_qid_Ptr,
    const short port_in_max_md,
    q_id_type* port_out_qid_Ptr,
    const short port_out_max_md,
    const module_id_type module_id )
```

TAL Syntax

```
INT PROC SM_DR_REGISTER_ (port_name_Ptr
                          port_in_qid_Ptr, port_in_max_md,
                          port_out_qid_Ptr, port_out_max_md,
                          module_id)
        CALLABLE, LANGUAGE C;
    STRING .EXT port_name_Ptr;
    INT(32) .EXT port_in_qid_Ptr;
    INT .EXT port_in_max_md;
    INT(32) .EXT port_out_qid_Ptr;
    INT .EXT port_out_max_md;
    INT .EXT module_id;
EXTERNAL;
```

Return Values

Returns zsm_err_ok if successful, error if not.

Pointers to the specified port's in and out queues are returned.

QIO Library External Specification

Error Values zsm_err_dr_inv_dev_name - the out queue for the specified device name was not found.

zsm_err_dr_dev_down - line is in the stopped state.

zsm_err_dr_inv_port_name - port has not been added.

zsm_err_dr_port_down - port is in the stopped state.

zsm_err_dr_port_inuse - port has already been registered.

zsm_err_semaphore_timeout - failed to get driver semaphore.

Any error returned from SM_Q_CREATE_.

Description

This function "registers" the designated client with the designated LAN (dev_name)and port (port_name). It will create both the input Q and output Q for this port and return the Q_ID for each to the caller. This enables communication to and from the LAN for packets with the LSAP configured in the port. Once SM_DR_REGISTER_ completes without error, port_in_qid queue will receive inbound packets for that port and the returned port_out_qid queue can be used for outbound packets. The client should then do SM_Q_PUT_MSG_ calls to the port_out_qid queue and check the port_in_qid queue by calling SM_Q_GET_MSG_ for the port_in_qid.

The port name is a 16 byte character string. The left-most 8 bytes contains the name of the line padded with blanks. The right-most 8 bytes contains the name of the port padded with blanks. A sample port name might be "$LAM1^^^#ARP^^^^" where the character "^" represents the space character.

The parameters port_in_max_md and port_out_max_md allow the caller to specify the maximum number of messages which can be placed on each queue.

This function will return an error code if the port has not been added or the line or port is not in the started state.

PSPEC

Verify that line exists and is in the started state.

QIO Library External Specification

Obtain driver semaphore. Return error if failed to get driver semaphore.

Find the DR_PCB for the specified port. Return an error if the port does not exist or the port is not in the started state.

If an entry already exists in the SDN-PCB table, the port has already been registered. Return an error.

Create the port's input and output queues using SM_Q_CREATE_. Setup the put procedure pointer in the out queue to point to the appropriate driver write routine.

Add an entry to the SDN-PCB table so the interrupt handler can route inbound packets to the appropriate queue (port_in_qid).

Return QID of port's input and output queues.

QIO Library External Specification

5.4 SM_DR_WR_3615_

C Syntax short SM_DR_WR_3615_ (
    q_id_type q_id,
    msg_desc_type *md_Ptr)

TAL Syntax

NONE. Not callable via TAL.

Return Values

Returns zsm_err_ok if successful, error if not.

Error Values zsm_err_dr_inv_dev_name - TLAM has de-allocated driver resources. This happens when TLAM is stopping..

zsm_err_semaphore_timeout - failed to get driver semaphore.

zsm_err_bad_user_data_Ptr - caller has failed to leave enough space between the beginning of the buffer and MD->user_data_read_Ptr. The amount of space required by the driver is

QIO Library External Specification returned in the lip_aggr_size field of the dr_info structure. This error could also occur if MD->user_data_read_Ptr starts on an odd byte boundary.

zsm_dr_state - the line or port is not in the started state. Use SM_DR_GET_INFO_ to find the state of the line and port.

zsm_err_dr_md_limit_exceeded - indicates that the caller has exceeded the number of MDs per message. The current limit is 50.

Description

This function is installed as the "put" function for client out queues by SM_DR_REGISTER_. The purpose of this function is to transfer messages from the host cpu to the 3615 LAN controller.

The out queue and MD are passed as input parameters. Note that a message is never actually placed onto the client's out queue. An internal queue is instead used to process outbound messages. This made it easier to maintain the FIFO ordering of messages.

A typical invocation would result in the MD being added to the write queue. After the MD is queued, messages on the write queue are processed. See the PSPEC section to get details on how messages are processed.

PSPEC

Obtain driver semaphore. Return error if failed to get driver semaphore.

Verify that the first MD contains enough space to prepend the LIP/AGGR header. Return error if there is not enough space.

Ensure that the line and port are in the started state. Note that if the line is in the recovering state (meaning TLAM is recovering from an I/O error), the message is still queued. If the line and port are not in the started state, return an error.

Format the LIP/AGGR header and add the MD onto the interal write queue.

Begin processing messages on the write queue. If there are enough IOCs to process the first message on the write queue, allocate the IOCs and dequeue the message from the write

QIO Library External Specification queue. Continue processing messages on the write queue until the write queue is empty or there are not enough IOCs available.

If there were any messages dequeued, call the NSK procedures IOK_EIOC_INIT_ and DOIOPLEASE to initiate the I/O.

If DOIOPLEASE returns an error, change the driver state to recovering and send an event to TLAM so he can process the EIO error.

QIO Library External Specification

5.5 SM_EVENT_CHECK_

C Syntax short SM_EVENT_CHECK_ (
    module_id_type module_id;
    short* event_flag )

TAL Syntax

INT PROC SM_EVENT_CHECK_ ( module_id, event_mask )
        CALLABLE, LANGUAGE C;
    INT(32) module_id;
    INT .EXT event_flag;
EXTERNAL;

Return Values 0 if successful, error if not.

Error Values zsm_err_invalid_module_id

Description

This will return a copy of the module's event flag at the time of the call. The actual event flag is reset under MUTEX.

PSPEC

Get event from module control block
Return event .

QIO Library External Specification

5.6 SM_EVENT_POST_

C Syntax short SM_EVENT_POST_ (
    short event_type,
    module_id_type module_id )

TAL Syntax

INT PROC SM_EVENT_POST_ (event_type, event_info, module_id)
    CALLABLE, LANGUAGE C;
    INT event_type;
    INT(32) module_id;
EXTERNAL;

Return Values 0 if successful, error if not.

Error Values

| | |
|---|---|
| zsm_err_invalid_module_id | if module_id is wrong |
| zsm_err_event_q_full | if target module q is full |

Description

This will post an event for the specified module. Events currently include evt_seg_state_change & evt_q_non_empty. Each POST_EVENT call should post a single event.

PSPEC

Start Critical Section
    Put event type in module's event flags

QIO Library External Specification

End Critical Section

Post a Shared Memory Event to module receiving event

End Critical Section

Return status

QIO Library External Specification

5.7 SM_MD_GET_

C Syntax short SM_MD_GET_ (
    module_id_type module_id,
    long length,
    msg_desc_type **md_PtrPtr )

TAL Syntax

INT PROC SM_MD_GET_ ( module_id, length, md_PtrPtr)
    CALLABLE, LANGUAGE C;
  INT(32) module_id;
  INT(32) length;
  INT(32) .EXT md_PtrPtr;
EXTERNAL;

Return Values 0 if successful, error if not.

A message descriptor address if successful (ZSM_NULL_ADDRESS if not) in *md Ptr.

Error Values zsm_err_invalid_module_id zsm_err_no_msg_desc_avail zsm_err_acctg_limit_exceeded

Description

This returns a message descriptor and attached BD & Buffer in the pointer md_Ptr. The buffer will be at least as big as the length requested and it may be larger if SMLIB has only larger

QIO Library External Specification sizes. If there is no message descriptor available, ZSM_NULL_ADDRESS will be loaded for a pointer, and zsm_err_no_msg_desc_available will be returned.

PSPEC

Start Critical Section

Scan triple lists to find on with buffers big enough for request.

If one is available

Check to see if accounting is enabled for this module, if so, check to see if this request will exceed the limit for the module, if so, return zsm_err_acctg_limit_exceeded Dequeue a message descriptor from the corresponding triple Free List Decrement current count End Critical Section Else Set current MD to ZSM_NULL_ADDRESS

Put md_ptr in callers pointer location

Return status

QIO Library External Specification

5.8 SM_MD_GET_DUPLICATE_

C Syntax

```
short SM_MD_GET_DUPLICATE_ (
    module_id_type module_id,
    msg_desc_type *md_Ptr,
    msg_desc_type **md_PtrPtr )
```

TAL Syntax

```
INT PROC SM_MD_GET_DUPLICATE_ (module_id, md_Ptr, md_PtrPtr)
    CALLABLE, LANGUAGE C;
    INT(32) module_id;
    INT(32) .EXT md_Ptr;
    INT(32) .EXT md_PtrPtr;
EXTERNAL;
```

Return Values 0 if successful, error if not.

A message descriptor address if successful (ZSM_NULL_ADDRESS if not) in *md Ptr.

Error Values zsm_err_invalid_module_id zsm_err_wait_for_md zsm_err_no_msg_desc_avail

Description

This returns a duplicate message descriptor. The MD will point to the same BD and data area (read & write pointer) as the referenced MD passed in. The BD reference count will be

QIO Library External Specification incremented. If there is no message descriptor available, ZSM_NULL_ADDRESS will be loaded for a pointer, and zsm_err_no_msg_desc_available will be returned.

PSPEC

Start Critical Section

If a message descriptor is available,

Dequeue a message descriptor from MD Free List

Decrement current count

End Critical Section

Copy reference MD into new MD

Increment the BD Reference count

Put md_ptr in callers pointer location

Else

Put ZSM_NULL_ADDRESS in callers pointer location

Return status

QIO Library External Specification

5.9 SM_MD_RETURN_

C Syntax short SM_MD_RETURN_(
    module_id_type module_id,
    msg_desc_type *md_ptr )

TAL Syntax

INT PROC SM_MD_RETURN_( segment_id, module_id, md_ptr)
    CALLABLE, LANGUAGE C;
    INT(32) module_id;
    INT .EXT md_ptr;
EXTERNAL;

Return Values 0 if successful, error if not.

Error Values zsm_err_invalid_module_id zsm_err_invalid_md_ptr

Any error from SM_BD_RETURN

Any error from PUT_DATA_Q if MD has return q specified.

Description

This will return a message descriptor pointed to by md_ptr. If there is a Return Q specified in the MD, the message will be put on that Q by a call to SM_Q_PUT_MSG. If Return Q is null, the MD will be unlinked from any continued MDs in the message and put into the MD free list. The reference count in the BD will be decremented and if it goes to 0, it will be returned

QIO Library External Specification by calling SM_BD_RETURN_. The continue MD now becomes the top MD and the process is repeated until there are no more continue MDs in the message.

PSPEC

DO:
    Assure md_ptr is valid

IF MD Return Q is valid, SM_Q_PUT_MSG_ the MD. Mark MD_Continue False.

ELSE Unlink MD from the MD_Continue MD.

Put MD on MD free List (Critical sections)

Decrement BD Reference Count and if 0 SM_BD_RETURN_ the BD

WHILE MD_Continue <> NULL

QIO Library External Specification

5.10 SM_MODULE_ID_CREATE_

C Syntax short SM_MODULE_ID_CREATE_ (
    module_id_type *module_id_Ptr )

TAL Syntax

INT PROC SM_MODULE_ID_CREATE_( module_id_ptr )
    CALLABLE, LANGUAGE C;
  INT(32) .EXT module_id_ptr;
EXTERNAL;

Return Values 0 if successful, error if not.

A module ID if successful, ZSM_NULL_MODULE_ID if not.

Error Values zsm_err_semaphor_timeout zsm_err_no_mem_avail zsm_err_getpool_failed

Description

This will return a unique module_id_Ptr to the caller which is needed for many shared memory calls. Space for the module control block will be allocated out of the global SHARED_MEMORY_IO_POOL.

PSPEC

Get shared pool semaphore

QIO Library External Specification

GetPool (Shared_Memory_IO_Pool,$len(module control block + smem_evt_q_cnt * $LENevent_info_record)

Return shared pool semaphore

Initialize module control block and event q

Start Critical Section

Add new module to created modules list.

End Critical Section.

Put module_id_Ptr in callers pointer location.

Return status.

QIO Library External Specification

5.11 SM_MODULE_ID_DELETE_

C Syntax

```
short SM_MODULE_ID_DELETE_ (
     module_id_type module_id )
```

TAL Syntax

```
INT PROC SM_MODULE_ID_DELETE_ (module_id)
       CALLABLE, LANGUAGE C;
    INT(32) module_id;
EXTERNAL;
```

Return Values 0 if successful, error if not.

A module ID if successful, ZSM_NULL_MODULE_ID if not.

Error Values zsm_err_putpool_failed

Description

This will cleanup the resources associated with this Module. This includes all POOLs and Qs and the module control block itself. Care must be taken by the client to not use any of these resources after this call. Any messages returned to clients Qs that have been deleted will be freed by the library function.

PSPEC

Go through Module_CB and:

Find POOLs owned and SM_POOL_PUT_ each one.

Find Qs owned and SM_Q_DELETE_ each one.

QIO Library External Specification

Putpool the Module_ID.

Return status.

QIO Library External Specification

5.12 SM_MODULE_SET_LIMITS_

C Syntax short SM_MODULE_SET_LIMITS_ (
    module_id_type module_id,
    short percent )

TAL Syntax

INT PROC SM_MODULE_SET_LIMITS_( module_id, percent )
    CALLABLE, LANGUAGE C;
    INT(32) module_id;
    INT percent;
EXTERNAL;

Return Values 0 if successful, error if not.

Error Values zsm_err_bad_module_id zsm_err_bad_acctg_limit

Description

This function will set the space consumption limits for the module specified. The amount of buffer space that can be owned by this module is defined by the percent parameter. If the module reaches the limit and tries to get more buffer space, an error will be returned. If it reaches the limit and another inbound message is received, it will be dropped and not sent to the modules inbound q.

PSPEC

QIO Library External Specification

Description

This will load a ZSM_NULL_ADDRESS if unsuccessful, otherwise it load a pointer to a block of memory allocated out of the shared memory pool, of length block_sizeb, for module_id. This will get a semaphore while updating the pool header, releasing it when safe to. If locked is true, the pool space will be locked. the returned block is not guarenteed to be aligned on any particular boundary, the caller must do this if needed.

PSPEC

Get Shared_Memory_Pool_Header Semaphore

@returned_block = Getpool (blocksizeb + SM_pool_hdr_sizeb)

Return Shared_Memory_Pool_Header Semaphore

Add Client Module_ID to base of Pool. Increment Pool Address and put in callers
   parameter *BlockPtrPtr.

Return status

QIO Library External Specification

5.15 SM_POOL_PUT_

C Syntax short SM_POOL_PUT_ (
    module_id_type module_id,
    char *block_Ptr )

TAL Syntax

INT PROC SM_POOL_PUT_ (module_id, block_Ptr)
    CALLABLE, LANGUAGE C;
    INT(32) module_id;
    INT .EXT block_Ptr;
EXTERNAL;

Return Values 0 if successful, error if not.

Error Values zsm_err_invalid_module_id zsm_err_semaphor_timeout zsm_err_putpool_failed

Description

This will return a block of memory pointed to by block_Ptr, allocated out of the shared memory pool for module_id. This will get the shared memory pool header semaphore while updating the pool header, releasing it when safe to.

PSPEC

Get Shared_Memory_Pool_Header semaphore

QIO Library External Specification

@returned_block = Putpool (pool_Head,address - sm_pool_hdr_length)

Return Shared_Memory_Pool_Header semaphore

Remove this pool from module_id.pools_owned list

Return status

QIO Library External Specification

5.16 SM_Q_CHECK_

C Syntax

```
short SM_Q_CHECK_ (
     q_id_type q_id
     short *count_ptr )
```

TAL Syntax

```
INT PROC SM_Q_CHECK_( q_id, count_ptr)
        CALLABLE, LANGUAGE C;
    INT(32) q_id;
    INT .EXT count_ptr;
EXTERNAL;
```

Return Values 0 if successful, error if not.

Count of message descriptors in Q if successful.

Error Values zsm_err_invalid_q_id

Description

This returns the count of message descriptors in the Q defined by q_id.

PSPEC

Get count of Messages in queue and store in users location

Return status.

QIO Library External Specification

5.17 SM_Q_CREATE_

C Syntax short SM_Q_CREATE_ (
    module_id_type module_id,
    char *qname,
    short max_q_depth,
    short q_post,
    short (*q_put) (),
    short (*q_get) (),
    void *user_control_block,
    q_id_type *q_id_Ptr )

TAL Syntax

INT PROC SM_Q_CREATE_(module_id, qname, max_q_depth, q_post,
                          q_put_ptr, q_get_ptr, q_id_Ptr)
    CALLABLE, LANGUAGE C;
  INT(32) module_id;
  STRING .EXT qname;
  INT max_q_depth;
  INT q_post;
  INT .EXT q_put_ptr;
  INT .EXT q_get_ptr;
  STRING .EXT user_control_block_Ptr
  INT(32) .EXT q_id_Ptr;
EXTERNAL;

Return Values

Returns 0 if successful, error if not.

QIO Library External Specification

Error Values zsm_err_invalid_qname zsm_err_duplicate_qname zsm_err_q_not_created

Description

This creates the Q in the shared segment and returns a unique id representing the Q. The qname is intended to be a human-readable and human-meaningful ASCII string of 24 bytes (null terminated) that identifies the Q. The module_id identifies the module that should be awoken when a message is added to that queue. The q_post specifies if the client should be awoken when data is put on this Q. The values for *q_put() and *q_get() should be 0 if not used.

PSPEC

Start Critical Section

Next, obtain Q_header_ptr by looking through qs for unused entry.

End Critical Section

Next, check for duplicate q names.

Next, initialize the Q_header with all relevant data.

Next, return Q_Ptr to callers q_id location.

Return status

QIO Library External Specification

5.18 SM_Q_DELETE_

C Syntax

```
short SM_Q_DELETE_ (
    q_id_type q_id )
```

TAL Syntax

```
INT PROC SM_Q_DELETE_ (q_id)
        CALLABLE, LANGUAGE C;
    INT(32) q_id;
EXTERNAL;
```

Return Values 0 if successful, error if not.

Error Values zsm_err_invalid_qid zsm_err_q_not_created zsm_err_q_not_empty

Any errors from SM_Q_GET_MSG_

Any errors from SM_MD_RETURN_RETURN_

Description

This returns all messages on the Q using SM_MD_RETURN_. It then returns the Q space for reuse.

QIO Library External Specification

PSPEC

Next, While q_ptr -> current_q_count

SM_MD_RETURN_ ( q_ptr -> module_id, dequeued MD_ptr)

Next initialize module_id, q_name, q_attr and q_state in q_header.

Return status

QIO Library External Specification

5.19 SM_Q_GET_ID

C Syntax short SM_Q_GET_ID(
    char * qname
    q_id_type *q_id_Ptr )

TAL Syntax

INT PROC SM_Q_GET_ID (qname, q_id_Ptr)
    CALLABLE, LANGUAGE C;
    STRING .EXT qname;
    INT(32) .EXT q_id_Ptr;
EXTERNAL;

Return Values 0 if successful, error if not.

A QID if successful, ZSM_NULL_QID if not in.

Error Values zsm_err_invalid_qname zsm_err_q_not_found

Description

This will return a pointer to the Q specified by qname in the shared segment. It is possible for ZSM_NULL_QID to be returned. E.g. where the Q was not found.

PSPEC

Search through Q headers for qname match

QIO Library External Specification

Put q pointer in callers pointer location
Return status

QIO Library External Specification

5.20 SM_Q_GET_MSG_

C Syntax short SM_Q_GET_MSG_ (
    q_id_type q_id,
    msg_desc_type **md_PtrPtr )

TAL Syntax

INT PROC SM_Q_GET_MSG_ (q_id, md_PtrPtr)
        CALLABLE, LANGUAGE C;
    INT(32) q_id;
    INT(32) .EXT md_PtrPtr;
EXTERNAL;

Return Values 0 if successful, error if not.

A pointer to a msg descriptor if successful (ZSM_NULL_ADDRESS if not) in *md_PtrPtr.

Error Values zsm_err_invalid_q_id zsm_err_q_empty

Description

This dequeues and returns a message descriptor pointer for the message at the top of the Q specified by q_id.

PSPEC

Start Critical Section

QIO Library External Specification

If q is empty
End Critical Section
    then put ZSM_NULL_ADDRESS in *md_ptrptr and status = zsm_err_q_empty
Else q is not empty
    Dequeue the first message descriptor from Q
    Decrement current q count
    Update the q_hdr first MD pointer
    Change previous MD pointer in the top MD
    End Critical Section
    Next, clean up MD
    Next put md_ptr in callers location;
Return status

QIO Library External Specification

5.21 SM_Q_PUT_MSG_

C Syntax short SM_Q_PUT_MSG_ (
    q_id_type q_id,
    msg_desc_type *md_Ptr,
    short post_event )

TAL Syntax

INT PROC SM_Q_PUT_MSG_(q_id, md_Ptr, post_event)
    CALLABLE, LANGUAGE C;
    INT .EXT q_id;
    INT .EXT md_Ptr;
    INT post_event;
EXTERNAL;

Return Values 0 if successful, error if not.

Error Values zsm_err_invalid_qid zsm_err_invalid_md zsm_err_event_q_full

QIO Library External Specification

Description

This adds the message pointed to by md_ptr to the bottom of the Q identified by q_id. If post_event is true, a evt_q_non_empty event will be posted to the module that created the Q.

If the specified Q is a port out queue created by SM_DR_REGISTER_, a driver function is invoked instead of queueing the message. For the 3615 controller, the driver function is called SM_DR_WR_3615_. See the function description for SM_DR_WR_3615_ to find the possible return codes.

PSPEC

Next, if message descriptor isn't valid
        then return error zsm_err_invalid_md Next, if Q isn't valid (not a Q or state != started)
        then return zsm_err_invalid_q Next, Start Critical Section Add MD to queue Increment current MD count If Post Event
    If target queue's event q is not full
        Add q_non_empty event to target queue's module_cb
    else
        status = zsm_err_event_q_full End Critical Section Return status

QIO Library External Specification

5.22 SM_SEGMENT_ATTACH_

C Syntax short SM_SEGMENT_ATTACH_( short smlibh_version )

TAL Syntax

INT PROC SM_SEGMENT_ATTACH_( smlibh_version )
       CALLABLE, LANGUAGE C;
   INT smlibh_version;
   EXTERNAL;

Return Values

Returns zsm_err_ok if successful, error if not.

Error Values zsm_err_allocatesegment_failed zsm_err_usesegment_failed zsm_err_reusesegment_failed zsm_err_wrong_smlib_version     if the version used by the attaching process is different than the version used by SMON to create the segment.

Description

This function does an ALLOCATESEGMENT of an existing shared segment created by the SMON process in this CPU. The segment must have been previously created by the SMMON process in the same CPU or zsm_err_allocatesegment_failed will be returned. Also the SMON process must be running at the time of the SM_SEGMENT_ATTACH_ call.

QIO Library External Specification

PSPEC

Find SMON Pin

Do an ALLOCATESEGMENT sharing by PIN.

Do a USESEGMENT to shared segment.

Check SM_Version in segment for match with library.

Do a USESEGMENT back to original extended segment.

Return status.

QIO Library External Specification

5.23 SM_SPACE_GET_

C Syntax

```
short SM_SPACE_GET_ (
    module_id_type module_id,
    long *block_sizeb,
    char **block_addr )
```

TAL Syntax

```
INT PROC SM_SEGMENT_ATTACH_( module_id, block_sizeb, block_addr )
        CALLABLE, LANGUAGE C;
    INT(32) module_id;
    INT(32) block_sizeb;
    STRING .EXT block_addr;
```

EXTERNAL Return Values 0 if successful, error if not.

Error Values zsm_err_no_mem_avail

Description

This function will get the IOPRM space.

PSPEC

APPENDIX

B

4.3 Library Headers and Data Structures

The following data structures are defined in file nv.h, which comes as part of the Version 2 socket library:

```
struct nv_addr    {
     unsigned char s_net [4];
     unsigned char s_host [6];
     unsigned short s_port;
};

struct sockaddr_nv {
     short snv_family;
     struct nv_addr snv_addr;
     unsigned char snv_reserved [2];
};
```

4.4 Socket Calls Supported

The calls described in this section work both with IPX/SPX and TCP/IP. A full description of these calls, including the syntax and semantics of parameters, can be found in [tcp] and [sock]. For some of the primitives, minor differences in options or parameters exist; these differences (if any) are highlighted below.

accept (), accept_nw (), accept_nw2 ()

These three primitives work exactly the same way as with TCP/IP:

Accept() listens for a connection on an existing socket, creates a new socket for data transfer, and accepts a connection on the new socket.

Accept_nw() listens for a connection on an existing socket. Accept_nw2() accepts a connection on a new socket, which needs to have been created with the socket_nw() call.

bind (), bind_nw ()

bind () and bind_nw () work similarly as with TCP; a call to either routine will bind a socket with a local IPX address.

However, the restriction on port number (IPX socket) 1-1024 does not apply.

connect (), connect_nw()

These calls work exactly the same way as with TCP/IP, i.e. both connect a socket to a remote socket. However, the value of parameter *address_len* must be size_of (sockaddr_nv).

getpeername(), getpeername_nw ()

These calls work exactly the same way as with TCP/IP, i.e. either function returns the address of the remote endpoint.

getsockname (), getsockname_nw ()

getsockname() and getsockname_nw() work the same way as with TCP, i.e. either function returns the address, including the IPX socket number, to which the (Berkeley) socket is bound.

getsockopt (), getsockopt_nw ()

getsockopt () and getsockopt_nw () return the socket options for a socket. Only socket level options are supported for IPX/SPX, meaning that parameter *level* can have only one possible value:

SOL_SOCKET    socket level option

Parameter *optname* may have one of the following possible values:

| | |
|---|---|
| SO_ERROR | gets and clears *errno* |
| SO_TYPE | gets the socket type |
| SO_LINGER | causes connections to close gracefully |
| SO_KEEPALIVE | use keep-alive messages to keep connection alive during inactivity |
| SO_OOBINLINE | keep out-of-band data with normal data | listen ()

listen () is provided for compatibility. Unlike with [tcp], the call does not set the limit on the maximum number of SPX connections awaiting acceptance on a socket.

perror ()

perror () works the same way as with TCP, i.e. it prints the text message associated with the current value of errno, to the standard error file, stderr. (This routine is now part of clib).

recv (), recv_nw ()

recv () and recv_nw () receive data on a connected SPX or IPX socket, as described in [sock] and [tcp]:

nrecvd = recv (sock, pBuff, bufflen, flag);
    error = recv_nw (sock, pBuff, bufflen, flag, tag);

The only difference is that with IPX/SPX, the MSG_OOB flag does not apply. In fact, the only flag supported is MSG_PEEK; flag value of anything other than MSG_PEEK will result in a normal read.

recvfrom (), recvfrom_nw ()

recvfrom () and recvfrom_nw () receives data on an IPX socket. The only flag supported is MSG_PEEK; flag value of anything other then MSG_PEEK will result in normal read.

send (), send_nw ()

send () and send_nw () send data on a connected SPX or IPX socket.

sendto (), sendto_nw ()

sendto () and sendto_nw () send data on an IPX socket.

send_nw2 ()

send_nw2 () sends data on an SPX socket. Unlike the send_nw() call, send_nw2 () does not require the application to allocate two bytes at the beginning of its data buffer.

setsockopt (), setsockopt_nw ()

setsockopt () and setsockopt_nw () set the socket options for a socket.

Parameter *level* specifies the level at which the socket option is being managed. The only permissible value is:

SOL_SOCKET    socket level option

Parameter *optname* may have one of the following possible values:

| | |
|---|---|
| SO_LINGER | graceful close |
| SO_KEEPALIVE | keep connection alive; always turned on, cannot be turned off |
| SO_OOBINLINE | keep out-of-band data with normal data; always turned on, SPX will never deliver any OOB data |

The following options are not supported:
    SO_BROADCAST, SO_DONTROUTE, SO_REUSEADDR
    SO_SNDBUF, SO_RCVBUF shutdown (), shutdown_nw ()

shutdown () and shutdown_nw () terminate data transfer on an active SPX socket.

socket (), socket_nw ()

The socket() call creates a socket for waited operations; the socket_nw() call creates a socket for nowait operations.

Parameter *address_family* must have the value AF_NV.

Parameter *socket_type* must have one of the following values:

SOCK_STREAM    create a SPX socket
SOCK_DGRAM     create an IPX socket

Parameter *protocol* is always ignored.

All other parameters and considerations are the same as for TCP.

**socket_backup(*msg, *prim_phandle)**

*socket_backup()* allows a backup process to open a socket in the backup mode. The socket must have been first opened by the primary process. *\*msg* contains the information obtained by the primary process via *socket_get_open_info()*.

Sections 7.4 and 7.6, together with document [sock] provide additional details about NonStop programming with sockets.

socket_get_len()

A call to *socket_get_len()* returns the number of bytes sent by a previous a *sendto_nw()* or *send_nw2()* call. *Socket_get_len()* must be called after the send operation completes via AWAITIOX.

socket_get_info()

This function retrieves the sockaddr and the associated sockaddr length associated with the last delivery via *recvfrom_nw()*. socket_get_info() must be called after the receive operation has beeen completed and signalled via AWAITIOX.

**socket_get_open_info(*msg)**

This primitive, together with *socket_backup()*, provides support for an application written as a NonStop process pair. The primary process must first open and bind the socket. Once a socket is bound (see figure 4.1), the primary process should call *socket_get_open_info()* to obtain information associated with the socket; then, it should immediately checkpoint this information to the backup process.

socket_ioctl (), socket_ioctl_nw ()

socket_ioctl () and socket_ioctl_nw () perform a control operation on a socket.

Parameter command must have one of the following values:

FIONREAD     get # of bytes waiting to be read
SIOCSHIWAT   set the socket high-water mark
SIOCGHIWAT   get the socket high-water mark
SIOCATMARK   check for pending urgent data (option supported but SPX will never deliver any urgent data)

No other commands are supported for IPX/SPX.

4.5 New IPX-Only Calls ipx_addr ()

struct nv_addr *ipx_addr (char *pAddr);

This function takes an IPX address in hexadecimal format and converts it to the binary format (i.e., it returns a ponter to type nv_addr, defined in section 4.3).

ipx_ntoa ()

char *ipx_ntoa (struct nv_addr *nvaddr);

ipx_ntoa() performs a conversion opposite to that performed by ipx_addr(), i.e. it converts an IPX address from binary format to hexadecimal format.

socket_set_nv_name ()

void socket_set_nv_name (char *pName);

A call to this function will set the name of the IPX/SPX process the socket library is to open on subsequently made socket() calls. Existing open sockets are unaffected.

4.6 Socket Calls Not Supported

The following should not be used with IPX/SPX:

gethostbyaddr (), host_file_gethostbyaddr ()
    gethostbyname (), host_file_gethostbyname ()
    getservbyname ()
    getservbyport ()
    gethostid ()
    gethostname ()
    getnetbyaddr ()
    getnetbyname ()
    getprotobyname ()
    getprotobynumber ()
    inet_addr ()
    inet_inaof ()
    inet_makeaddr ()
    inet_netof ()
    inet_network ()
    inet_ntoa ()
    socket_set_inet_name ()
    t_sendto_nw ()
    t_rcvfrom_nw ()

All the above calls work only for the TCP/IP protocol suite. An IPX/SPX application that attempts to make one of the above calls will either receive file system error 2 ("operation not valid on this file", for the file-oriented calls), or it may get an erroneous result (on all the other calls).

APPENDIX

C

QIO Library Interface Specification

4.5 Events

This section describes the events client's can expect.

ZSM_EVT_Q_NON_EMPTY indicates one of the client's queues has an MD.

ZSM_EVT_TLAM_STOPPED indicates that the TLAM IOP is stopping. This event is generated by TLAM.

ZSM_EVT_PORT_STOPPED indicates that the port associated with the client is being stopped. This event is generated by TLAM.

ZSM_EVT_PORT_DELETED indcates that the port associated with the client is being deleted. This event is generated by TLAM.

ZSM_EVT_PORT_STARTED indicates that the port associated with the client is being started. This event is generated by TLAM.

ZSM_EVT_OWNERSHIP indicates that access to the line must be thru the "other" cpu (ie. TLAM has switched cpus). This event is generated by TLAM.

ZSM_EVT_MSG_NOT_DELIVERED indicates that an inbound message was "dropped" due to the client using too much memory. This event is generated by the IH.

4.6 Message and Buffer Descriptor User Fields

There are several fields in the message descriptor and buffer descriptor that can be used by client processes to tag messages with private data. The following tables show these fields and their intended use. This is especially important if the client processes receive QIO messages that they need to act on. The fields in the MD and BD may be in use by the sender of the message and should not be overwritten by the receiving process. If the receiving process needs to mark a buffer by using the MD or BD fields, it should get a new MD or Triple to mark as the sender may have already marked the message with it's own tags.

The following table shows the MD fields and their uses by the Library, Driver and Cleints. Any fields not listed are considered library private and shoud not be referenced by client processes. R - Read, W - Write, NR - Not Referenced, RW/

QIO Library Interface Specification

Restore - these may be used by the clients, but must be restored to NULL_ADDRESS before returning to the library.

Table 1: MD Fields Available to Client Processes

| Msg_Desc Field | Library | Driver | Client |
|---|---|---|---|
| next_md | RW | RW/Restore | RW/Restore |
| prev_md | RW | RW/Restore | RW/Restore |
| cont_md | RW | R | RW |
| bd | RW | R | R |
| return_q_id | RW | RW | RW |
| user_data_read_Ptr | RW | R on outbound W on inbound | W on outbound R on inbound |
| user_data_write_Ptr | RW | R on outbound W on inbound | W on outbound R on inbound |
| user_message_type | NR | NR | RW |
| user_message_state | NR | NR | RW |
| user_message_tag | NR | NR | RW |

The following shows the BD fields and their uses.

Table 2: BD Fields Available to Client Processes

| Buf_Desc Field | Library | Driver | Client |
|---|---|---|---|
| data_buffer_base_Ptr | RW | NR | R |
| data_buffer_limit_Ptr | RW | NR | R |
| data_buffer_length | RW | NR | R |
| user_data_type | NR | NR | RW |
| user_data_len | NR | NR | RW |
| user_data_off | NR | NR | RW |

QIO Library External Specification

5.13 SM_MSG_GET_DUPLICATE_

C Syntax short SM_MSG_GET_DUPLICATE_ (
    module_id_type module_id,
    msg_desc_type *md_Ptr,
    msg_desc_type **md_PtrPtr )

TAL Syntax

INT PROC SM_MSG_GET_DUPLICATE_ (module_id, md_Ptr,
                                          md_PtrPtr)
    CALLABLE, LANGUAGE C;
    INT(32) module_id;
    INT(32) .EXT md_Ptr;
    INT(32) .EXT md_PtrPtr;
EXTERNAL;

Return Values 0 if successful, error if not.

A message descriptor address if successful (ZSM_NULL_ADDRESS if not) in *md PtrPtr.

Error Values zsm_err_invalid_module_id zsm_err_no_msg_desc_avail

Description

This function will duplicate an entire message starting at the MD passed in as the reference MD. It returns a message descriptor that will point to the same BD and data area (read & write pointer) as the referenced MD passed in. Also all MDs on the cont_md chain will be duplicated and chained on the duplicate cont_md chain. The BDs referenced will have their

QIO Library External Specification reference counts incremented for each MD duplicated. If there is no message descriptor available, ZSM_NULL_ADDRESS will be loaded for a pointer, and zsm_err_no_msg_desc_available will be returned.

PSPEC

While MDs to copy
    Start Critical Section
    If a message descriptor is available,
        Dequeue a message descriptor from MD Free List
        Decrement current count
        End Critical Section
        Copy reference MD fields into new MD
        Increment the BD Reference count for this MD's BD
    Else
        Put ZSM_NULL_ADDRESS in md_ptr
        Return all MD's in duplicate message
Put md_ptr in callers pointer location
Return status

QIO Library External Specification

5.14 SM_POOL_GET_

C Syntax short SM_POOL_GET_ (
    module_id_type module_id,
    long block_sizeb,
    char **block_PtrPtr,
    short locked )

TAL Syntax

INT PROC SM_POOL_GET_ (module_id, block_sizeb, block_PtrPtr)
    CALLABLE, LANGUAGE C;
    INT(32) module_id;
    INT(32) block_sizeb;
    INT(32) .EXT block_PtrPtr;
    INT locked;
EXTERNAL;

Return Values 0 if successful, error if not.

A pool block address if successful (ZSM_NULL_ADDRESS if not) in *block_PtrPtr.

Error Values/ zsm_err_semaphor_time zsm_err_invalid_semaphor_event zsm_err_getpool_failed zsm_err_no_mem_avail

We claim:

1. In a data processing system, a method for transferring a message between a plurality of processes, the data processing system having at least a first processor with a first memory, a second processor with a second memory, and an inter-processor bus, the method comprising:

designating a portion of the first memory to be a shared memory segment;

creating an input queue in the shared memory segment for a first process of the first processor;

storing in the input queue, by a second process of the first processor, a pointer to a message to be transferred;

retrieving by the first process, the message pointed to by the stored pointer; and using the inter-processor bus to copy the message to the second memory of the second processor to increase fault tolerance in the data processing system.

2. In a data processing system, a method for transferring a message between a plurality of processes using a single memory, the data processing system having at least a processor with a memory, the method comprising:

designating a portion of the memory to be a shared memory segment;

creating an input queue in the shared memory segment for a first process of the processor;

storing in the input queue, by a second process of the processor, a pointer to a message to be transferred; and retrieving by the first process, the message pointed to by the stored pointer.

3. The method of claim 2, wherein the data processing system additionally includes an inter-processor bus, and further comprising:

using the inter-processor bus to copy the message to a memory of a second processor to increase fault tolerance in the data processing system.

4. In a data processing system, a method for transferring a message between a plurality of processes, the data processing system having at least a first processor with a first memory, a second processor with a second memory, and an inter-processor bus, the method comprising:

designating a portion of the first memory to be a shared memory segment;

creating an input queue in the shared memory segment for a first process of the first processor;

storing in the input queue, by a second process of the first processor, a pointer to a message to be transferred;

retrieving by the first process, the message pointed to by the stored pointer; and using a messaging system to transfer a copy of the message to a third process to increase fault tolerance in the data processing system.

5. The method of claim 4, wherein the first process is executed by the first processor using the first memory, and the third process is executed by the second processor, using the second memory, the method further comprising:

transferring the message between the first and the third processes over the inter-processor bus.

6. The method of claim 4, wherein the first and third processes are both executed by the first processor, using the first memory.

7. In a data processing system, a method for transferring a message between processes and a driver, the data processing system having at least a first processor with a first memory, the method comprising:

designating a portion of the first memory to be a shared memory segment;

creating an input queue in the shared memory segment for the driver;

storing in the input queue, by a first process, a pointer to a message to be transferred;

retrieving by the driver, the message pointed to by the stored pointer; and using a message system to transfer a copy of the message to a second process to increase fault tolerance in the data processing system.

8. The method of claim 7, wherein the data processing system includes a second processor with a second memory and an inter-processor bus, and wherein the first process is executed by the first processor using the first memory, and the second process is executed by the second processor, using the second memory, the method further comprising:

transferring the message between the first and the second processes over the inter-processor bus.

9. The method of claim 7, wherein the first and second processes are both executed by the first processor, using the first memory.

10. In a data processing system, a method for transferring a message within a driver, the data processing system having at least a first processor with a first memory, the method comprising:

designating a portion of the first memory to be a shared memory segment;

creating an input queue for a first component of the driver in the shared memory segment;

storing in the input queue, by a second component of the driver, a pointer to a message to be transferred;

retrieving by the first component of the driver, the message pointed to by the stored pointer; and using a message system to transfer a copy of the message to a process to increase fault tolerance in the data processing system.

11. The method of claim 10, wherein the data processing system includes a second processor with a second memory and an inter-processor bus, and wherein the driver is executed by the first processor using the first memory, and the driver is executed by the second processor, using the second memory, the method further comprising:

transferring the message between the first and the second processes over the inter-processor bus.

12. The method of claim 11, wherein the driver and the process are both executed by the first processor, using the first memory.

13. A method of transferring a message between processes in a data processing system having at least a first processor with a first memory, a second processor with a second memory, and an inter-processor bus, comprising the steps, performed by the data processing system, of:

allocating a shared memory segment in the first memory of the data processing system;

creating an input queue for a first process in the first processor in the shared memory segment;

storing, by a second process in the first processor, in the input queue of the first process, a pointer to a message to be transferred;

retrieving by the first process, the message pointed to by the pointer stored in the input queue of the first process; and using the inter-processor bus to copy the message to the second memory of the second processor to increase fault tolerance in the data processing system.

* * * * *